A. M. DEMUTH.
COOKING APPARATUS.
APPLICATION FILED JULY 28, 1920.
1,393,761.
Patented Oct. 18, 1921.
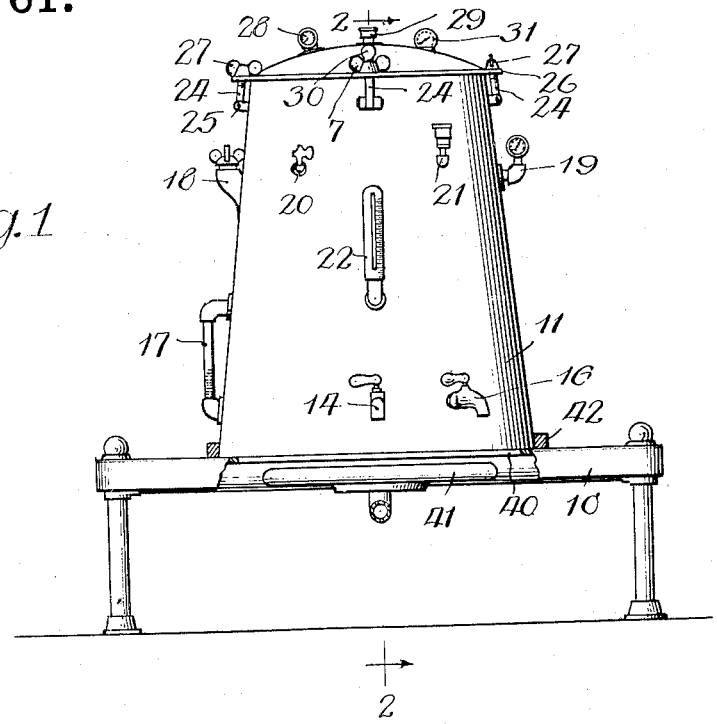
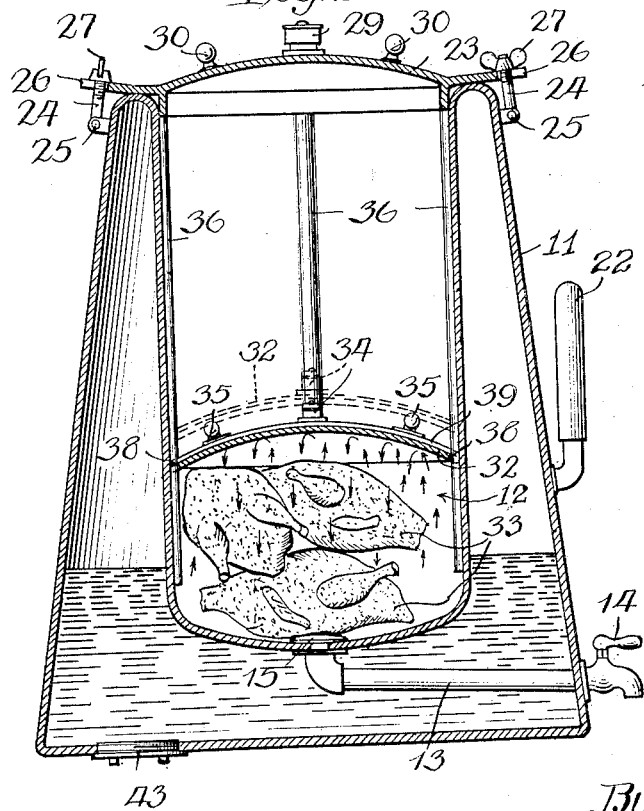
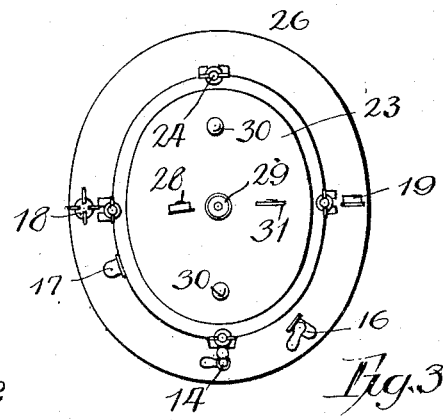
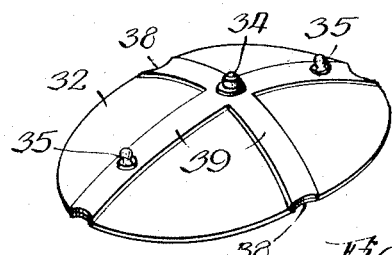
Inventor,
Alfred M. Demuth,
By: Jochum Jr. Atty.

UNITED STATES PATENT OFFICE.

ALFRED M. DEMUTH, OF CHICAGO, ILLINOIS, ASSIGNOR TO DEMUTH MANUFACTURING COMPANY, OF CHICAGO, ILLINOIS, A CORPORATION OF ILLINOIS.

COOKING APPARATUS.

1,393,761.  Specification of Letters Patent.  Patented Oct. 18, 1921.

Application filed July 28, 1920. Serial No. 399,572.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This invention relates to improvements in cooking apparatus by means of which, articles of food can be cooked entirely in their own juices by means of the heat of boiling or hot water, or steam maintained under a predetermined degree of pressure, and one of the objects of the invention is to provide improved means whereby the steam from the article being cooked will be maintained in close proximity to the article of food and circulated thereover and thereagainst so that the essence of the article will not be carried off by the steam, and at the same time the steam or vapor from the heating medium will not come into contact with the article.

A further object is to provide an improved freely movable baffle or deflector which is adapted to engage and rest against the article of food and which baffle or deflector is adapted to maintain the pressure of the vapor therebeneath at a predetermined degree but will be freely adjusted or moved by the varying degrees of pressures of vapor therebeneath.

A further object is to provide an improved baffle or deflector of this character having improved means whereby the pressure of the vapor therebeneath may be automatically relieved when such pressure increases beyond a predetermined degree.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention and in which—

Figure 1 is a view partly in side elevation and partly broken away.

Fig. 2 is a vertical longitudinal sectional view as taken on line 2—2 Fig. 1.

Fig. 3 is a top plan view of Fig. 2.

Fig. 4 is a detail perspective view of the baffle or deflector.

Referring more particularly to the drawing the numeral 10 designates generally a supporting structure which may be of any desired size and configuration and constructed of any suitable material and in any desired manner.

Mounted upon this structure is a closed tank 11, which may also be of any desired size and configuration.

Projecting into the tank is an opening chamber 12, which is spaced from the walls of the tank so as to permit a circulation of the heating fluid within the tank and around the chamber.

The space between the tank and chamber is sealed to prevent the escape of steam or vapor around the chamber, and the chamber and tank are preferably oval in cross section so as not to interfere with the circulation of the heating medium within the tank.

If desired there may be provided a draw off conduit 13, which leads from the bottom of the chamber 12, to extend through the wall of the tank and a valve or stop cock 14, may be provided for controlling the conduit. The opening in the bottom of the chamber forming a communication between the chamber and the conduit may be closed with a suitable closure in the form of a removable plug 15, which latter may be omitted when cooking articles containing considerable juice but when the apparatus is used for cooking articles which do not contain very much juice, the plug may be inserted to close the opening.

The tank may be provided with a draw-off cock 16, a water gage 17, a fill opening 18, a pressure gage 19, a pet cock 20 to permit the escape of air when the temperature of the heating medium is being raised, a safety blow-off 21, of any desired or suitable construction, and a thermometer 22, to indicate the temperature of the heating medium.

The chamber 12, is provided with a suitable closure or cover 23, which is secured in position in any suitable manner such as by means of fastening bolts 24, pivotally mounted as at 25, and adapted to stand between ears or in a bifurcation 26, on the closure, and a thumb or wing nut 27, is screwed upon the ends of each of the bolts 24, and engage the ears 26, so as to seal the closure into position to prevent the escape of steam or vapor from the chamber 12.

Connected with the cover or closure 23 is a pressure gage 28, to indicate the pressure in the chamber, and a safety blow-off valve 29, is also connected with the closure to permit the escape of excess steam or vapor. Handles 30 may also be provided upon the closure 23 and an indicator or gage 31 may also be provided upon the closure and which gage is adapted to be set so as to indicate the time at which the article within the receptacle that is being cooked should be removed therefrom.

Arranged within the chamber 12 is a downwardly opening concaved deflector 32 which is of a configuration to conform to the contour of the chamber 12 and the edges of the deflector or baffle are adapted to slide smoothly against the wall of the chamber. This deflector or baffle 32 is adapted to engage and rest against the article 33 within the chamber that is being cooked, so that when the steam or vapor which arises from the article during the cooking operation contacts with the downwardly opening surface of the deflector or baffle, the steam or vapor will circulate thereacross and will be deflected back against the article so as to keep the steam or vapor in close proximity to and circulating over and against the article. The deflector or baffle fits the chamber to such an extent that it will maintain practically all of the steam or vapor therebeneath, and the weight of the deflector or baffle is such that it will be maintained in its position against the article until the degree of pressure of the vapor or steam therebeneath increases beyond a predetermined point. When the steam or vapor does increase beyond such a point the deflector or baffle will be automatically raised by such pressure, and when such pressure decreases the baffle will automatically drop in a direction toward the article.

The construction of the baffle is such that when the edge thereof engages the article there will be a space between the article and the baffle or deflector so as not to interfere with the circulation of the steam or vapor thereacross.

If desired a relief valve 34 may be provided in the baffle or deflector so as to permit the steam or vapor to escape therethrough and this relief valve is set for a predetermined pressure.

Handles 35 may be provided by means of which the baffle may be placed in position or transported.

In the operation of this device and as the pressure of the steam or vapor beneath the baffle or deflector increases beyond the point or degree at which the relief valve 34 is set, the vapor or steam will be discharged through the valve into the chamber above the baffle or deflector and as the steam or vapor accumulates thereabove, it will, when the pressure reaches a predetermined degree be automatically discharged through the relief valve 29 in the closure 23. In order that the accumulation of the steam or vapor in the upper part of the chamber above the baffle will not interfere with the free movement of the baffle or deflector in a direction away from the article, it is necessary to relieve the pressure above the baffle or deflector so that the pressure will not reach the same degree as it is beneath the baffle which would then counterbalance the baffle or deflector and prevent the same from rising, the relief valve 29 is set to operate at a lower degree than the pressure which will operate the relief valve 34 in the baffle or deflector.

As a means for guiding the baffle or deflector in its movement toward and away from the article, there may be provided ribs or guideways 36 which are arranged upon and extend along the wall of the chamber 12. The baffle or deflector is provided with notches or recesses 38 opening through the edges thereof and into which recesses the ribs or guides 36 project, it being understood that the guides 36 and the recesses 38 may be of any desired configuration and fit to such an extent that the free and easy movement of the deflector or baffle will not be interfered with.

To remove the article, the deflector or baffle may be readily lifted from the chamber 12 by the handles 35 after the closure 23 has been removed.

If desired and in order to reinforce or strengthen the baffle, reinforcing ribs 39 may be provided.

The support 10 is provided with an opening 40 therethrough beneath which opening is arranged a burner 41 and the support 10 is provided with a flange 42 encompassing the opening 40 and within which flange the tank 11 is adapted to be placed so as to position the same above the burner 41.

Obviously the tank may be readily removed from the support when desired.

A clean-out opening may be provided in the wall of the tank 11, and this opening may be closed with a suitable plug 43.

While the preferred form of the invention has herein been shown and described, it is to be understood that various changes may be made in the details of construction and in the combination and arrangement of the several parts within the scope of the claims without departing from the spirit of this invention.

What is claimed as new is:—

1. A cooking apparatus embodying a cooking chamber, a baffle within and extending across the chamber, said baffle confining the steam therebeneath and being freely movable by the action of the steam thereupon, toward and away from the article to be cooked and supported upon and by said article, and a closure for the chamber.

2. A cooking apparatus embodying a cooking chamber, a baffle within and extending across the chamber, said baffle confining the steam therebeneath and being freely movable by the action of the steam thereupon, toward and away from the article to be cooked and adapted to engage and rest upon the said article, means within the chamber for guiding the baffle in its movements in directions toward and away from the said article, and a closure for the chamber.

3. A cooking apparatus embodying a cooking chamber, a baffle within and extending across the chamber, said baffle confining the steam therebeneath and being freely movable toward and away from the article to be cooked and adapted to engage and rest upon the said article, and a closure for the chamber, the said baffle being adapted to be automatically moved in directions away from and toward the said article by the changes in the degree of pressure of the vapor therebeneath.

4. A cooking apparatus embodying a cooking chamber, a detached downwardly opening concaved baffle within and extending across the chamber, said baffle being supported by the articles of food in the chamber and operating to direct the vapor circulating thereacross back against the article of food, the said baffle also operating to confine the steam therebeneath, and a closure for the chamber.

5. A cooking apparatus embodying a cooking chamber, a detached downwardly opening concaved baffle within and extending across the chamber, said baffle being supported by the articles of food in the chamber and operating to direct the vapor circulating thereacross back against the article of food, and a closure for the chamber, the said baffle confining the vapor therebeneath and being bodily and automatically movable in directions away from and toward the article as the degree of pressure of the vapor therebeneath increases and decreases beyond predetermined limits.

6. A cooking apparatus embodying a cooking chamber, a detached downwardly opening concaved baffle within and extending across the chamber, said baffle being supported by the articles of food in the chamber and operating to direct vapor circulating thereacross back against the article of food, a closure for the chamber, and means operating automatically to relieve the pressure of the vapor beneath the baffle.

7. A cooking apparatus embodying a cooking chamber, a detached downwardly opening concaved baffle within and extending across the chamber, said baffle being supported by the articles of food in the chamber and operating to direct vapor circulating thereacross back against the article of food, a closure for the chamber, and means operating automatically to relieve the pressure of the vapor beneath the baffle, the said means embodying a relief valve carried with the baffle.

8. A cooking apparatus embodying a cooking chamber, a detached downwardly opening concaved baffle within and extending across the chamber, said baffle being supported by the articles of food in the chamber and operating to direct vapor circulating thereacross back against the article of food, said baffle also operating to confine the vapor therebeneath, a closure for the chamber, and a guide for the baffle, said guide extending along the wall of the chamber and with respect to which guide the baffle is freely movable.

9. A cooking apparatus embodying a cooking chamber, a detached downwardly opening concaved baffle within and extending across the chamber, said baffle being supported by the articles of food in the chamber and operating to direct vapor circulating thereacross back against the article of food, a closure for the chamber, means operating automatically to relieve the pressure of the vapor beneath the baffle, and means operating automatically to relieve the pressure in the chamber above the baffle.

10. A cooking apparatus embodying a cooking chamber, a detached downwardly opening concaved baffle within and extending across the chamber, said baffle being supported by the articles of food in the chamber and operating to direct vapor circulating thereacross back against the article of food, a closure for the chamber, means operating automatically to relieve the pressure of the vapor beneath the baffle, and means operating automatically to relieve the pressure in the chamber above the baffle, one of the said means operating at a different pressure from the other of the said means.

In testimony whereof I have signed my name to this specification, this 26th day of July, A. D. 1920.

ALFRED M. DEMUTH.